(12) United States Patent
Hammond, II et al.

(10) Patent No.: US 7,840,806 B2
(45) Date of Patent: Nov. 23, 2010

(54) SYSTEM AND METHOD OF NON-CENTRALIZED ZERO KNOWLEDGE AUTHENTICATION FOR A COMPUTER NETWORK

(75) Inventors: Frank J. Hammond, II, Palmer Lake, CO (US); Steven J. Carlander, Monument, CO (US); Frank J. Ricotta, Jr., Colorado Springs, CO (US)

(73) Assignee: Enterprise Information Management, Inc., Colorado Springs, CO (US)

( * ) Notice: Subject to any disclaimer, the term of this patent is extended or adjusted under 35 U.S.C. 154(b) by 1708 days.

(21) Appl. No.: 10/687,320

(22) Filed: Oct. 16, 2003

(65) Prior Publication Data

US 2004/0123156 A1    Jun. 24, 2004

Related U.S. Application Data

(60) Provisional application No. 60/418,889, filed on Oct. 16, 2002.

(51) Int. Cl.
    *H04L 9/32* (2006.01)
(52) U.S. Cl. .......................... 713/169; 726/4
(58) Field of Classification Search ................. 713/168, 713/169; 726/4
    See application file for complete search history.

(56) References Cited

U.S. PATENT DOCUMENTS

| | | | | |
|---|---|---|---|---|
| 4,748,668 A | * | 5/1988 | Shamir et al. ................. | 380/30 |
| 4,926,479 A | * | 5/1990 | Goldwasser et al. ........ | 713/180 |
| 4,956,863 A | * | 9/1990 | Goss ............................ | 380/30 |
| 4,969,189 A | * | 11/1990 | Ohta et al. .................... | 713/180 |
| 5,136,642 A | * | 8/1992 | Kawamura et al. .......... | 380/282 |
| 5,140,634 A | * | 8/1992 | Guillou et al. ............... | 713/180 |
| 5,146,500 A | * | 9/1992 | Maurer ......................... | 380/30 |
| 5,245,657 A | * | 9/1993 | Sakurai ......................... | 705/67 |
| 5,581,615 A | * | 12/1996 | Stern ........................... | 713/180 |
| 5,600,725 A | * | 2/1997 | Rueppel et al. .............. | 380/30 |
| 5,606,617 A | * | 2/1997 | Brands ......................... | 380/30 |
| 5,666,419 A | * | 9/1997 | Yamamoto et al. ........... | 380/28 |
| 5,987,138 A | * | 11/1999 | Gilbert et al. ................ | 380/30 |
| 6,011,848 A | * | 1/2000 | Kanda et al. ................. | 713/170 |
| 6,044,463 A | * | 3/2000 | Kanda et al. ................. | 713/168 |
| 6,069,647 A | * | 5/2000 | Sullivan et al. ............... | 725/29 |
| 6,076,163 A | * | 6/2000 | Hoffstein et al. ............ | 713/168 |
| 6,122,742 A | * | 9/2000 | Young et al. ................. | 726/10 |
| 6,154,841 A | * | 11/2000 | Oishi ........................... | 713/180 |

(Continued)

OTHER PUBLICATIONS

Menezes et al., Handbook of Applied Cryptography, 1996, CRC Press, chapter 10, pp. 385-424.*

(Continued)

*Primary Examiner*—David García Cervetti
(74) *Attorney, Agent, or Firm*—Lathrop & Gage LLP

(57) ABSTRACT

Zero-knowledge authentication proves identity without revealing information about a secret that is used to prove that identity. An authentication agent performs authentication of a prover agent without knowledge or transfer of the secret. A non-centralized zero-knowledge authentication system contains multiple authentication agents, for access by multiple computers seeking access on a computer network through local prover agents. Once authenticated, those multiple computers may also implement authentication agents. The secret may periodically expire by publishing a new encrypted secret by a trusted source, thwarting attempts to factor or guess information about the secret.

13 Claims, 5 Drawing Sheets

U.S. PATENT DOCUMENTS

| | | | |
|---|---|---|---|
| 6,189,098 B1* | 2/2001 | Kaliski, Jr. | 713/168 |
| 6,263,446 B1* | 7/2001 | Kausik et al. | 726/5 |
| 6,282,295 B1* | 8/2001 | Young et al. | 380/286 |
| 6,298,441 B1* | 10/2001 | Handelman et al. | 713/185 |
| 6,327,659 B2* | 12/2001 | Boroditsky et al. | 713/182 |
| 6,389,136 B1* | 5/2002 | Young et al. | 380/28 |
| 6,389,536 B1* | 5/2002 | Nakatsuyama | 713/165 |
| 6,411,715 B1* | 6/2002 | Liskov et al. | 380/277 |
| 6,567,916 B1* | 5/2003 | Terao et al. | 713/176 |
| 6,651,167 B1* | 11/2003 | Terao et al. | 713/168 |
| 6,889,322 B1* | 5/2005 | Levy | 713/168 |
| 6,937,728 B1* | 8/2005 | Abe et al. | 380/237 |
| 6,950,948 B2* | 9/2005 | Neff | 705/12 |
| 6,952,476 B1* | 10/2005 | Mao | 380/30 |
| 6,978,372 B1* | 12/2005 | Jakobsson | 713/180 |
| 7,003,541 B2* | 2/2006 | Furukawa et al. | 708/512 |
| 7,007,301 B2 | 2/2006 | Crosbie et al. | |
| 7,028,338 B1 | 4/2006 | Norris et al. | |
| 7,031,470 B1* | 4/2006 | Bar-On | 380/203 |
| 7,047,408 B1* | 5/2006 | Boyko et al. | 713/169 |
| 7,058,808 B1* | 6/2006 | Zolotorev et al. | 713/176 |
| 7,058,968 B2 | 6/2006 | Rowland et al. | |
| 7,062,490 B2* | 6/2006 | Adya et al. | 707/10 |
| 7,085,936 B1 | 8/2006 | Moran | |
| 7,089,323 B2* | 8/2006 | Theimer et al. | 709/238 |
| 7,096,499 B2 | 8/2006 | Munson | |
| 7,165,181 B2* | 1/2007 | Brickell | 713/182 |
| 7,181,768 B1 | 2/2007 | Ghosh et al. | |
| 7,184,547 B1* | 2/2007 | Girault et al. | 380/30 |
| 7,219,239 B1 | 5/2007 | Njemanze et al. | |
| 7,222,362 B1* | 5/2007 | Canetti et al. | 726/5 |
| 7,260,716 B1* | 8/2007 | Srivastava | 713/163 |
| 7,305,705 B2* | 12/2007 | Shelest et al. | 726/15 |
| 7,308,097 B2* | 12/2007 | Hoffstein et al. | 380/28 |
| 7,313,701 B2* | 12/2007 | Frankel et al. | 713/180 |
| 7,370,358 B2 | 5/2008 | Ghanea-Hercock | |
| 7,373,499 B2* | 5/2008 | MacKenzie et al. | 713/150 |
| 7,415,614 B2* | 8/2008 | Guillou | 713/176 |
| 7,543,139 B2* | 6/2009 | Camenisch et al. | 713/156 |
| 7,747,857 B2* | 6/2010 | Ramzan et al. | 713/168 |
| 2001/0034837 A1* | 10/2001 | Kausik et al. | 713/185 |
| 2001/0038696 A1* | 11/2001 | Frankel et al. | 380/286 |
| 2001/0042049 A1* | 11/2001 | Zucker et al. | 705/55 |
| 2001/0044895 A1* | 11/2001 | Hada | 713/168 |
| 2002/0007457 A1* | 1/2002 | Neff | 713/180 |
| 2002/0136401 A1* | 9/2002 | Hoffstein et al. | 380/30 |
| 2002/0188605 A1* | 12/2002 | Adya et al. | 707/4 |
| 2003/0065692 A1* | 4/2003 | Furukawa et al. | 708/277 |
| 2003/0115464 A1* | 6/2003 | Nyang et al. | 713/171 |
| 2003/0120929 A1* | 6/2003 | Hoffstein et al. | 713/176 |
| 2003/0158960 A1* | 8/2003 | Engberg | 709/237 |
| 2003/0172284 A1* | 9/2003 | Kittler | 713/186 |
| 2003/0177352 A1* | 9/2003 | Camenisch et al. | 713/158 |
| 2003/0182559 A1* | 9/2003 | Curry et al. | 713/189 |
| 2003/0196106 A1* | 10/2003 | Erfani et al. | 713/200 |
| 2004/0006650 A1* | 1/2004 | Theimer et al. | 709/313 |
| 2004/0008845 A1* | 1/2004 | Le et al. | 380/277 |
| 2004/0015719 A1 | 1/2004 | Lee et al. | |
| 2004/0028221 A1* | 2/2004 | Seysen | 380/28 |
| 2004/0054885 A1* | 3/2004 | Bartram et al. | 713/152 |
| 2004/0103281 A1* | 5/2004 | Brickell | 713/171 |
| 2004/0123141 A1 | 6/2004 | Yadav | |
| 2004/0133781 A1* | 7/2004 | Guillou | 713/170 |
| 2004/0177252 A1* | 9/2004 | Vallee et al. | 713/170 |
| 2005/0069135 A1* | 3/2005 | Brickell | 380/277 |
| 2005/0265550 A1* | 12/2005 | Tuyls et al. | 380/259 |
| 2007/0113077 A1* | 5/2007 | Brickell | 713/164 |

OTHER PUBLICATIONS

Amos Fiat and Adi Shamir, How to Prove Yourself: Practical Solutions to Identification and Signature Problems, 1987, Advances in Cryptology—Crypto '86, LNCS 263, pp. 186-194, Springer-Verlag Berlin Heidelberg 1987.*

Office Action dated Jan. 9, 2008, issued in related U.S. Appl. No. 10/758,852, 22 pages.

Response to Office Action, of Jun. 4, 2007, Related U.S. Appl. No. 10/758,852, filed Oct. 27, 2007.

Office Action, Related U.S. Appl. No. 10/758,852, filed Jun. 4, 2007.

Office Action issued in related U.S. Appl. No. 10/758,852, dated Apr. 28, 2009, 16 pages.

* cited by examiner

SYSTEM AND METHOD OF NON-CENTRALIZED ZERO KNOWLEDGE AUTHENTICATION FOR A COMPUTER NETWORK

RELATED APPLICATIONS

This application claims priority to U.S. application No. 60/418,889, filed Oct. 16, 2002, which is incorporated herein by reference.

BACKGROUND

Computer systems intercommunicate via computer networks. For example, a first computer system frequently communicates with a second computer system over a computer network to obtain information. The computer network may include many different communication media. In one example, the computer network is an Ethernet local area network ("LAN"). In another example, the computer network is a wireless LAN. Information stored on the first computer system is often sensitive such that access to the information must be restricted. Accordingly, the first computer system often requires that the second computer system be authenticated before allowing the second computer system to access the information. Access to the computer network may also be restricted, requiring any computer system wishing to join the computer network to be authenticated before communicating with other devices on the network.

Authentication typically utilizes an identification protocol that requires a computer system to identify itself with authority to access a restricted computer system. In one example, a first computer system may require a "password" from the second computer system to enable authentication. However, in situations where the communication between the first and second computer systems is monitored by a third computer system, the password may be obtained by the third computer system, allowing unauthorized access by the third computer system to the first computer system. Identification protocols that provide authentication without transmission of a secret password, known as a 'key', are therefore utilized. A zero-knowledge identification protocol ("ZKIP") is one example of a protocol that provides authentication without transmitting the key, thereby preventing the key from being stolen and misused.

Typically, in a computer network that uses authentication, there is only one authenticator that stores keys used to authenticate requests from other computer systems. The use of a single authenticator, however, may result in access problems when the computer system running the authenticator fails, or where communications to the authenticator fail, for example. Where the authentication is for important data or services, failure of the authenticator may prevent access to the data or services. Further, the use of a single authenticator also causes congestion within the computer network as all authentication traffic is directed to a single location.

Where a computer network is highly scalable and dynamic it is important to authenticate each computer system as it attempts to access the computer network. A digital mobile telephone network is one example of a dynamic computer network. The digital mobile telephone network consists of multiple base stations that are networked together, each base station providing one or more cells for the digital telephone network. Each mobile telephone handset connects to, and disconnects from, these cells as the handset changes location. It is therefore important that any authentication process used within the cell network be as fast and efficient as possible.

Typically, to meet speed requirements for a digital mobile telephone network, the authentication process is simplified, thereby making it less reliable and less secure, making the mobile telephone network highly susceptible to snooping by third parties.

SUMMARY OF INVENTION

U.S. Pat. No. 4,748,668, titled Method, Apparatus and Article for Identification and Signature, is incorporated herein by reference.

In one aspect, a method provides non-centralized zero knowledge authentication within a dynamic computer network. The dynamic computer network includes two or more authentication agents that interact with prover agents within computers wishing to gain access to the computer network. Using a zero-knowledge authentication protocol, the prover is either authenticated, or not, without communication of a secret.

In another aspect, a software product (firmware, for example) is distributed with a hardware device to provide non-centralized zero-knowledge authentication. In one example, the hardware device is a router connected to a network. The router communicates with a prover agent within a mobile computer (e.g., a laptop computer system or a mobile telephone handset) that seeks access to the network. Once the prover agent is authenticated and authorized, the router permits the mobile computer to access part of or the entire network.

In one aspect, methods are provided for authentication of identity or group membership. One such method involves zero-knowledge authentication. An authentication dialog between a verifying agent ("verifier") and an agent to be verified ("prover") is conducted without revealing information about a secret ("secret") that is used to prove identity (or group membership without actually disclosing prover's identity). Authentication is achieved when verifier asks prover I-times (I>0) to perform an action that can only be reliably performed by an entity that knows a secret. Prover answers verifier with results of action. If prover does not answer correctly, authentication is invalid. This challenge-response-validation iteration is repeated I-times to establish a sufficient level of probability that prover answered with knowledge of secret. One advantage of zero-knowledge authentication is inability for an eavesdropper to learn secret and steal means to prove identity to verifier. Another advantage is inability for verifier to later masquerade as a prover to a third-party.

In another aspect, methods are provided to allow for greater probability of correctly authenticating prover with fewer challenge-response-validation iterations. One such method allows prover to have a set, greater than two, of possible answers, as is provided by Fiat-Shamir protocol. For example, a prover that answers verifier correctly with a member of set $\{0, 1, 2, 3\}$ has a 25% chance of being incorrectly authenticated with one challenge-response-validation iteration. Following Fiat-Shamir protocol, prover will answer verifier with one of two possible answers $\{0, 1\}$ and thereby require two challenge-response-validation iterations to achieve the same level of authentication probability.

In another aspect, an authenticator agent require a prover agent to repeat an authentication protocol until a specified confidence level that a prover agent is correctly authenticated has been satisfied. For example, a confidence level of 99% may require 10 iterations, where a confidence level of 99.9999% may require 20 iterations.

In another aspect, a method of protecting a host from unauthorized client access over a network includes the steps of: creating a prover agent application on the client; creating a verifier agent application on the host; and creating a trusted source application to generate and publish encrypted values of a secret and product of first and second large prime numbers. The encrypted values are read for the secret and product, by the provider and verifier from the trusted source. The secret is decrypted, by the prover and verifier, and the product is decrypted, by the prover and verifier. A plurality of verification dialog is performed between the prover and verifier, wherein the prover demonstrates knowledge of the secret and product without exposing the values of the secret and product. The client is denied access when the prover fails to demonstrate knowledge of the secret and product, and granted access when the client succeeds in demonstrating knowledge of the secret and product.

In another aspect, methods are provided to validate agents without unique indicia. One such method allows agents to validate based on indicia that they are within a category of agents who have knowledge of secret common to all authentic agents. An advantage of using non-unique indicia is elimination of overhead required to generate, maintain, and validate unique indicia In another aspect, methods are provided to publish secret used to authenticate agents. One such method allows a trusted source to periodically update and publish the secret and product of two large prime numbers ("product"). The frequency of updates is less than the predicted length of time a malicious party could factor product or guess secret. Trusted source generates, encrypts, and publishes secret and product. Prover and verifier read encrypted values for secret and product, from trusted source, and use previous values of secret and product to decrypt new values for secret and product. Prover and verifier now have all information required to perform authentication processes.

One advantage of using methods described above is elimination of steps required to derive keys to encrypt and decrypt messages.

DETAILED DESCRIPTION OF DRAWINGS

Figure 1:
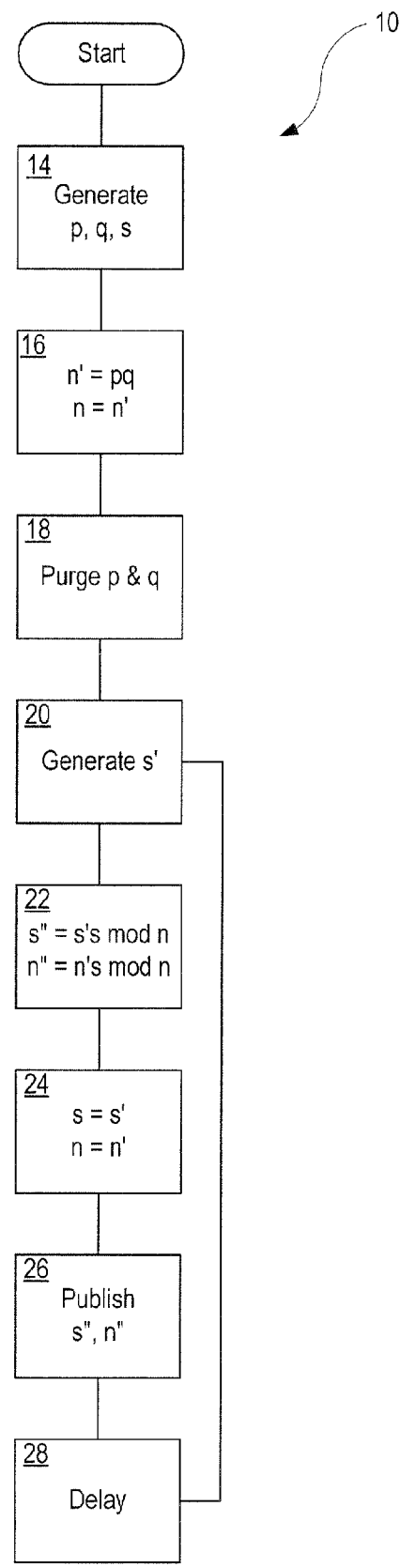
FIG. 1 is a flowchart illustrating one process for generating and publishing secret and product of two large prime numbers.

FIG. 1 shows one method 10 for generating and publishing a secret and a product of two large prime numbers. Method 10 is, for example, implemented by a 'trusted' source as described below. In step 14, an initial value of secret s is generated from a seed value, and two large prime numbers ("p" and "q") are randomly generated. Step 16 calculates a current product n' (n-prime) of the two large prime numbers p and q, and initializes previous product value n (n-not prime) as equal to n'. In step 18, p and q are purged and made unreadable. In step 20, current secret number s' (s-prime) is generated to be a value relatively prime to n, greater than 0, and less than n. In step 22, values for encrypted secret s" (s-double prime) and encrypted product of two large numbers n" (n-double prime) are generated as: s"=s's mod n, and n"=n's mod n. In step 24, previous secret number s (s-not prime) is set equal to s' and n is set equal to n'. In step 26, values for n" and s" are published. At this point, publication process is complete and process 10 waits in step 28.

Values for s" and n" may become compromised by a malicious party that is able to factor or guess values. Therefore, the delay in step 28 terminates before values are likely to be compromised and process 10 is restarted at step 20 where a new s' is generated.

Figure 2:
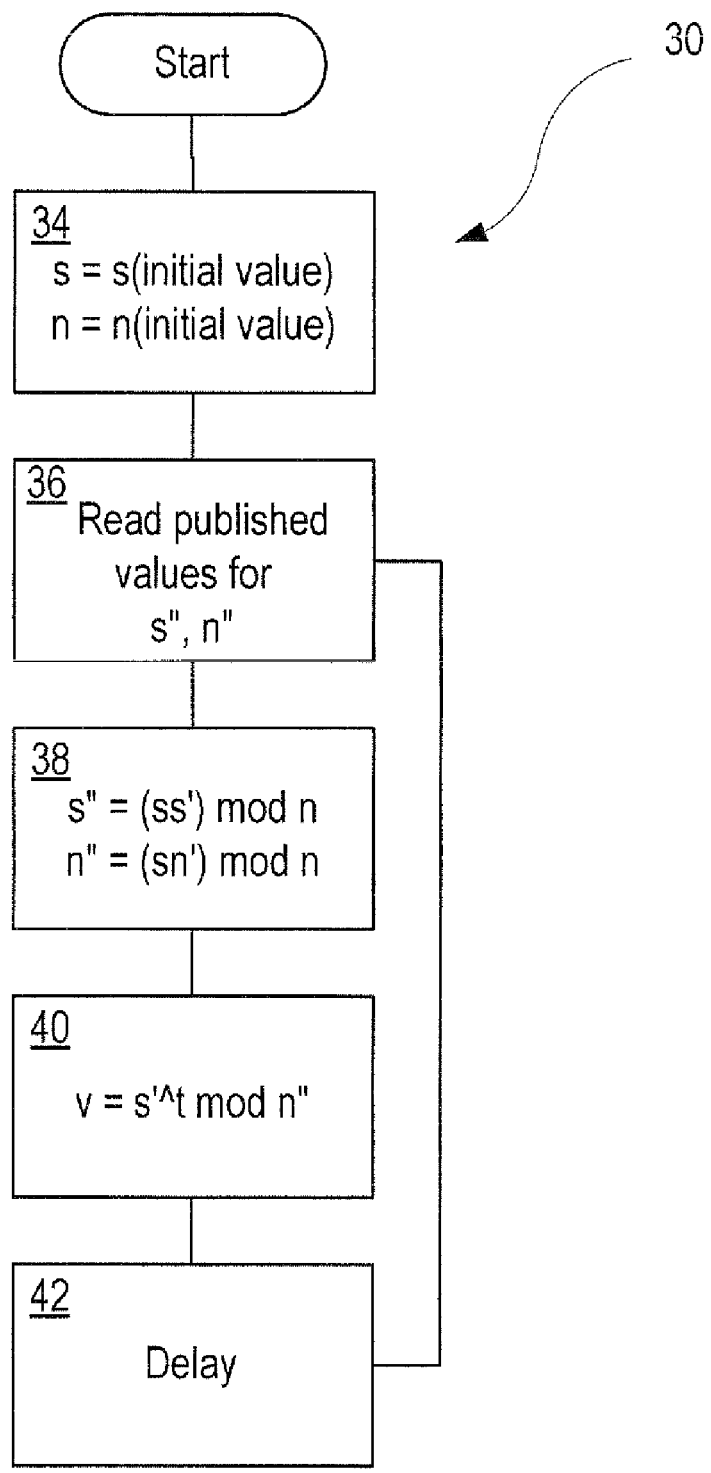
FIG. 2 shows a method of decrypting secret and product of two large prime numbers.

FIG. 2 shows one method 30 of decrypting secret s" and product n". In step 34, an agent (e.g., a prover agent or an authentication agent) is created with an initial value for s and n. In step 36, the agent reads values of s" and n" published by the trusted source (e.g., method 10, FIG. 1). In step 38, values of s" and n" are decrypted by a modulus inverse operation. In step 40, the size of answer set ("t") is used to determine a value ("v") calculated as result of s'^t mod n".

At this point, prover and verifier agents have data required to perform authentication. Because values for s" and n" published by trusted source periodically change, updated values for s" and n" will be retrieved. Step 42 is a delay based on a specific length of time or may be triggered at the start of an authentication process (e.g., a zero-knowledge identification protocol). After the delay in step 42, method 30 continues with step 36 and the agent will again contact the trusted source and read new values for s" and n".

Figure 3:
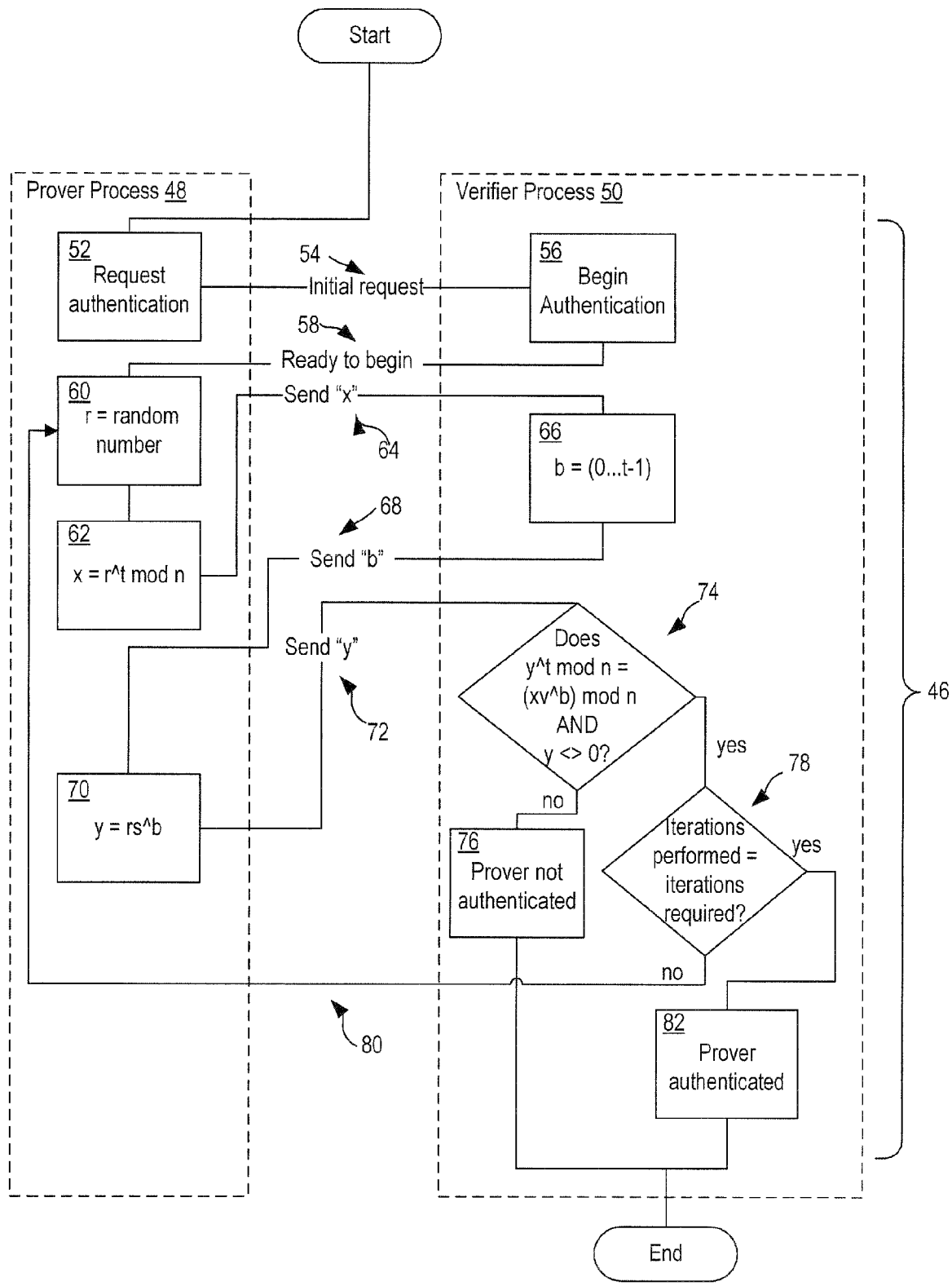
FIG. 3 shows a challenge-response-validation iteration process between prover and verifier agent.

FIG. 3 shows a challenge-response-validation iteration dialog between a prover agent (shown as process 48) and a verifier agent (shown as process 50). Process 48 performs processing to establish a need to authenticate and begins zero-knowledge identification protocol 46 in step 52, which may include retrieving and decrypting current values of secret s" and the product n". In step 52, process 48 (prover) sends a signal 54 to process 50 (verifier) to begin zero-knowledge identification protocol 46. In step 56, process 50 (verifier) performs any initial processing, which may include retrieving and decrypting current values of secret s" and product n". In step 56, process 50 sends signal 58 to process 48 (prover) to begin the authorization process. In step 60, process 48 (prover) generates a random number ("r"). Random number r is then used, in step 62, to generate a number x such that x=r{circumflex over ( )}t mod n. In step 62, process 48 sends a signal 64 containing x to process 50 (verifier). In step 66, process 50 (verifier) then calculates a reply value b as a member of set {0...t−1}. In step 66, process 50 sends a signal 68 containing b to process 48 (prover). In step 70, process 48 (prover) uses b to calculate a number y such that y=rs{circumflex over ( )}b. In step 70, process 48 sends a signal 72 containing y to process 50 (verifier). Step 74 in process 50 is a decision. In step 74, process 50 performs a test to determine if process 48 (prover) has passed this iteration of zero-knowledge identification protocol 46. If y{circumflex over ( )}t mod n=(xv{circumflex over ( )}b) mod n and y<>0, then process 50 continues with step 78; otherwise process 50 continues with step 76. Step 78 in process 50 is a decision. In step 78, the number of challenge-response-verification iterations is compared to the number of iterations required to establish a suitable probability of correct authentication. If the number of challenge-response-validation iterations performed is the same as the number of challenge-response-validation iterations required, and process 48 (prover) has not failed any iterations, then process 48 continues with step 82; otherwise process 50 sends a signal 80 to process 48 to continue with step 60, thus beginning another challenge-response-validation iteration by repeating steps 60 through 74.

In step 82, process 50 continues with processing appropriate for authenticated process 48 (prover) and process 50 terminates. In step 76, process 50 (verifier) continues processing as appropriate for non-authentic agents, and process 50 terminates.

Figure 4:
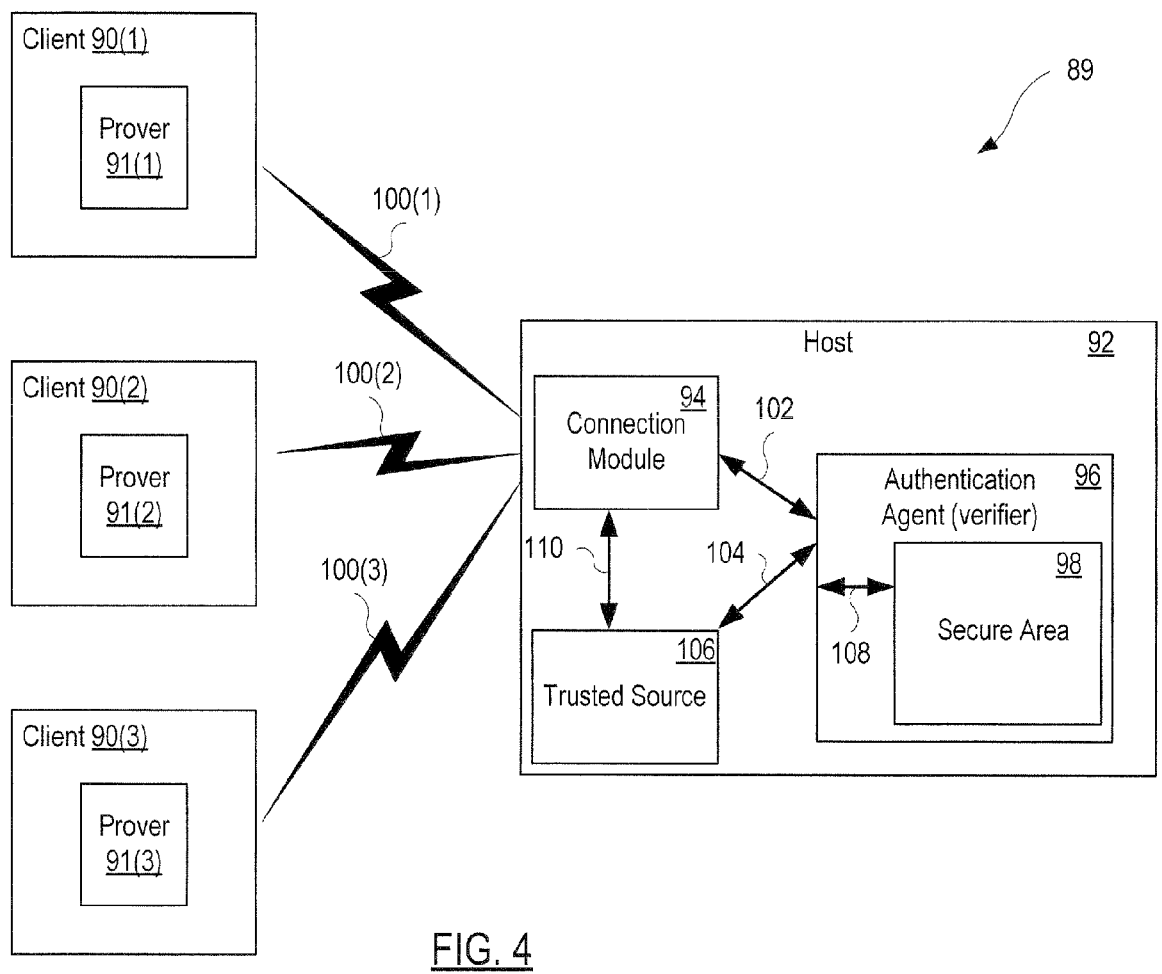
FIG. 4 shows a system with three clients, each including a prover agent, and a host computer with a verifier agent.

FIG. 4 shows a system 89 with three clients 90(1-3), each running a prover agent 91(1-3), and a host 92 running an authentication agent 96 (verifier). Prover agents 91(1-3) implement process 48, FIG. 3, for example. Authentication agent 96 implements process 50, FIG. 3, for example. Communication links 100(1-3) establishes connectivity between clients 90(1-3) and a connection module 94 within host 92. In system 89, client 90(1) seeks access to secure area 98 of host 92. Communication link 100(1) establishes connectivity between client 90(1) and connection module 94 within host 92. In one example, communication link 100(1) is a telephone dial-up connection. In another example, communication link 100(2) is an Internet connection. In another example, authentication agent 96 (verifier) protects secure area 98 allowing access only to authenticated clients. Communication link 100 (3) is an Ethernet LAN connection. After client 90(1) is authenticated by host (92), a connection 102 is established and client 90(1) is allowed access to secure area 98. Once this connection has been established, authentication agent 96 may distribute a new secret from trusted source 106 to prover agent 90(1) for use in future authentication dialog. When prover agent 90(1) requests authentication at a future time after connection 110 has been broken, authentication agent 96 requests credentials from prover agent 90(1) from trusted source 106 via the hosts internal connection 104. At this point the authentication dialog may take place between client 90(1) and host 92 to reestablish a trusted connection.

Zero-knowledge identification protocol 46, FIG. 3, is then performed. If zero-knowledge identification protocol 46 is successful, an access link 108 is activated to secure area 98, and client 90(1) may proceed with further processing. If zero-knowledge identification protocol 46 is not successful, processing continues with knowledge that client 90(1) is not authorized and, at a minimum, client 90(1) is inhibited from access to secure area 98.

Figure 5:
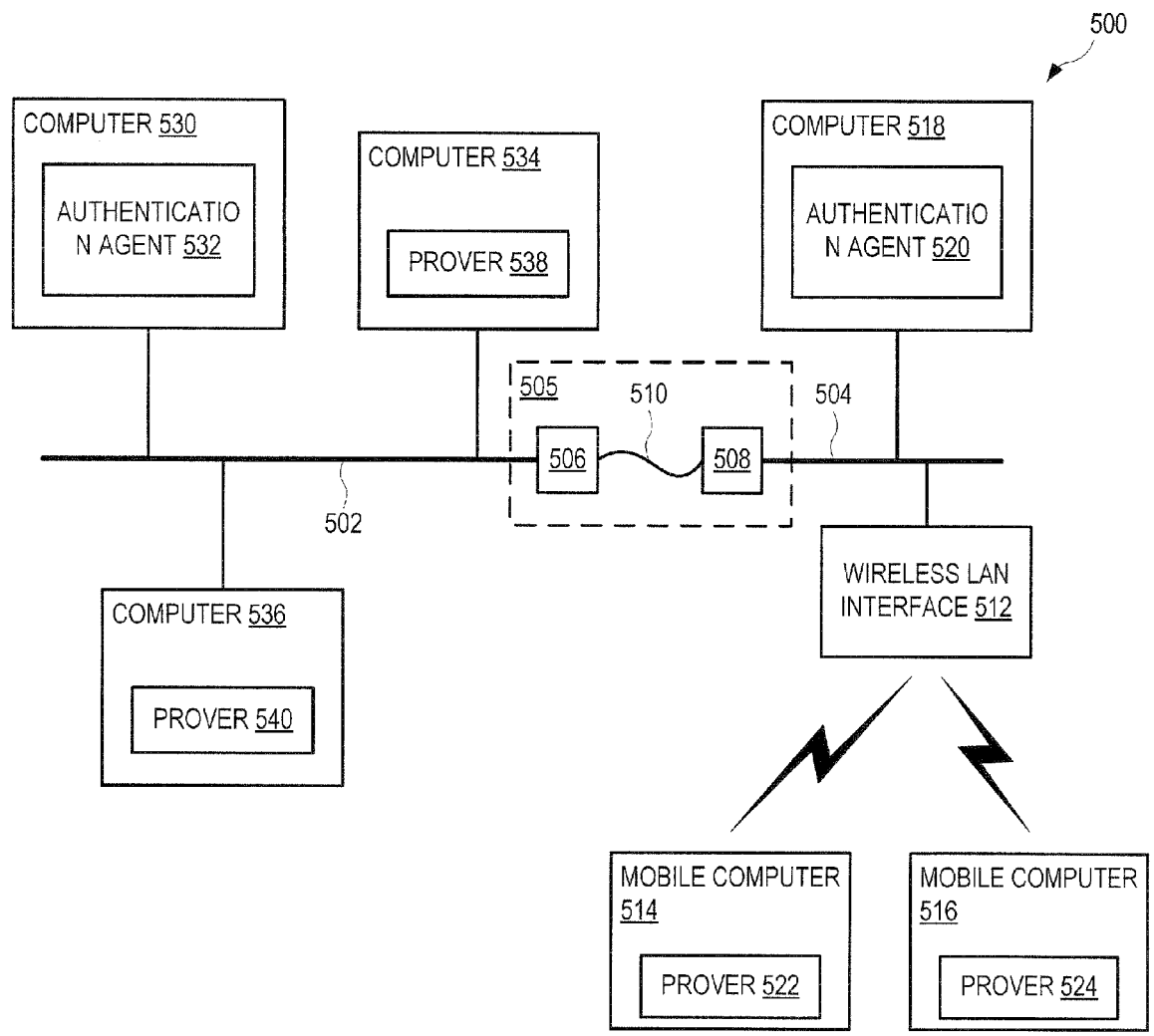
FIG. 5 illustrates one system for providing non-centralized zero knowledge authentication within a dynamic computer network.

FIG. 5 shows one system 500 that provides non-centralized zero-knowledge authentication within a dynamic network. Illustratively, system 500 includes two Ethernet LANs 502 and 504 that are not co-located. LAN 502 is connected to LAN 504 via a communication apparatus 505 that contains connection units 506, 508 and a communication link 510. Connection units 506 and 508 are, for example, routers or microwave transceivers. Communication link 510 is, for example, an ISDN link, the Internet, or a microwave link that provides data communication between two remote locations.

LAN 504 is shown connected to a wireless LAN device 512 that provides wireless connectivity to mobile computers 514 and 516. LAN 504 also illustratively connects to computer system 518 that includes authentication agent 520 (verifier). Before mobile computer 514 connects to LAN 504, it is first authenticated using zero-knowledge identification protocol 46 as shown in FIG. 3. Mobile computer 514 includes a prover agent 522 that interacts with authentication agent 520 to perform zero-knowledge identification protocol 46. Mobile computer 516 includes a prover agent 524 that interacts with authentication agent 520 to gain authentication to access LAN 504.

Trusted source 106, FIG. 4, implements process 10, FIG. 1, to generate a new secret s" and a new product n" periodically to prevent the malicious party compromising the values by guessing or factoring. Thus, once computer system 536 has been authenticated and is connected to LAN 502 it receives new values for secret s" and product n", using an encrypted message based on its current values for secret s" and product n". Thus, integrity and security of system 500 is maintained at a high level. Only during initialization of system 500, or when a mobile computer (e.g., mobile computers 514, 516) connects to wireless LAN interface 512 and requests authentication, is a predefined secret used.

Computer system 530 illustratively connects to LAN 502 and includes authentication agent 532 (prover). Computer systems 534 and 536 also connect to LAN 502; computer system 534 includes a prover agent 538 and computer system 536 includes a prover agent 540. Prover agent 538 interacts with authentication agent 532 to authenticate computer system 534 for access to LAN 502. Similarly, prover agent 540 interacts with authentication agent 532 to authenticate computer system 536 for access to LAN 502.

Authentication agents 520 and 532 operate independently to authenticate mobile computers 514, 516 and desktop computers 534, 536 for access to LANs 504 and 502, respectively. Optionally, once a computer (e.g., computers 534, 536 and mobile computers 514 and 516) is authenticated and remains connected within system 500, it may operate to authenticate other computers (i.e., may operate as an authentication agent). Further, once authenticated and connected within system 500, the computer may operate to interact with other computers seeking authentication, enabling communication between the other computers and an authentication agent.

For example, and with reference to FIG. 5, consider computer 518 and 530 existing on the computer network defined by LANs 502, 504 and communications link 510 (at boot up to establish the network, computer 518, 530 are initialized with the same secret and thus both operate with respective authentication agents, as shown). When any other computer 534, 536, 514, 516 desires access to this computer network, it may do so only through zero knowledge authentication, such as zero-knowledge identification protocol 46 (i.e., the dialog between authentication agent 520 and prover agent 538, 540, 522, 524, respectively). Once authenticated on the network, the computer may be promoted to operate with an additional authentication agent so as to provide authentication to other computers desiring access to the network. Accordingly, the network is "dynamic" in that it allows additional, flexible authentications to occur and expand the network. To enable this non-centralized zero knowledge authentication, authentication software (including authentication and prover agents) may be preloaded into each computer (e.g., computers 514, 516, 518, 530, 534, 536).

In one example, a computer network includes multiple base stations that operate to provide a mobile telephone network. Each base station contains an authentication agent. Each mobile handset includes a prover agent that connects to the mobile telephone network. Before the mobile handset is allowed to use any services of the mobile telephone network, the authentication agent in the base station selected by the mobile handset interacts with the prover agent in the mobile handset. If the authentication agent is satisfied that the prover knows the secret, it becomes authenticated and authorized to use the mobile telephone network. By using a ZKIP, the secret is never transmitted to or from the mobile handset, and therefore not susceptible to malicious snooping.

What is claimed is:

1. A method of protecting a host computer from unauthorized access by a client computer over a computer network, comprising the steps of:

installing a prover agent application on the client computer;

installing a verifier agent application on the host computer;

creating a trusted source application on the computer network to generate and publish encrypted values of a secret and product of first and second large prime numbers;

reading the encrypted values for the secret and product, by the prover and verifier from the trusted source;

decrypting the secret, by the prover and verifier;

decrypting the product, by the prover and verifier;

performing a plurality of verification dialog between the prover and verifier over the network, wherein the prover demonstrates knowledge of the secret and product without exposing the values of the secret and product, and wherein the client is denied access to a secure area of the host when the prover fails to demonstrate knowledge of the secret and product and granted access to the secure area when the client succeeds in demonstrating knowledge of the secret and product;

installing a first agent to be authenticated on a third computer on the network, the first agent having values for s, n and t, s being the secret, n being the product, and t being a size of an answer set;

installing a second agent on a fourth computer on the network, to authenticate the first agent, the second agent having values for s, n, and t;

generating r as a random number generated by the first agent;

calculating x by the first agent, r being raised to power of t modulus n;

sending x from the first agent to the second agent, over the network;

calculating b by the second agent, b being further defined as a member of set of integers from zero through t−1;

sending b from the second agent to the first agent, over the network;

calculating y by the first agent, y being a product of r*s raised to power of b;

sending y from the first agent to the second agent, over the network; and determining authentication of the first agent, by determining equivalence of a first equation to a second equation, if y is not equal to zero, first equation is y^t mod n and second equation is (xv^b) mod n.

2. The method of claim 1, wherein the steps of decrypting the secret and product further utilize previous values of the secret and product as operators in the modulus inverse operations, to decrypt new values for the secret and the product.

3. The system of claim 1, the client computer comprising a cell phone.

4. The system of claim 1, the computer network comprising one or more of the Internet, a local area network, a communications link, and a wireless network.

5. The system of claim 1, the prover agent, verifier agent, first agent and second agent being respectively installed on the client computer, the host computer, the third computer and the fourth computer through common software.

6. A method of protecting a host computer from unauthorized access by a client computer over a computer network, comprising the steps of:

installing a prover agent application on the client computer;

installing a verifier agent application on the host computer;

creating a trusted source application on the computer network to generate and publish encrypted values of a secret and product of first and second prime numbers;

reading the encrypted values for the secret and product, by the prover and verifier from the trusted source;

decrypting the secret, by the prover and verifier;

decrypting the product, by the prover and verifier;

performing a plurality of verification dialog between the prover and verifier over the network, wherein the prover demonstrates knowledge of the secret and product without exposing the values of the secret and product, and wherein the client is denied access to a secure area of the host when the prover fails to demonstrate knowledge of the secret and product and granted access to the secure area when the client succeeds in demonstrating knowledge of the secret and product;

wherein the prover has values for s, n and t, s being the secret, n being the product, and t being a size of an answer set and wherein the verifier having values for s, n and t; the verification dialog between the prover and verifier including:

generating r as a random number by the prover agent;

calculating x by the prover agent, r being raised to power of t modulus n;

sending x from the prover agent to the verifier agent, over the network;

calculating b by the verifier agent, b being further defined as a member of set of integers from zero through t−1;

sending b from the verifier agent to the prover agent, over the network;

calculating y by the prover agent, y being a product of r*s raised to power of b;

sending y from the prover agent to the verifier agent, over the network; and determining authentication of the prover agent, by determining equivalence of a first equation to a second equation, if y is not equal to zero, the first equation is y^t mod n and the second equation is (xv^b) mod n.

7. The system of claim 6, the client computer comprising a cell phone.

8. The system of claim 6, the computer network comprising one or more of the Internet, a local area network, a communications link, and a wireless network.

9. The system of claim 6, the prover agent and the verifier agent being respectively installed on the client computer and the host computer through common software.

10. A method of protecting a host computer from unauthorized access over a computer network, comprising the steps of:

installing a prover agent application on a client computer;

installing a verifier agent application on the host computer;

creating a trusted source application on the computer network to generate and publish encrypted values of a secret and product of first and second large prime numbers;

reading the encrypted values for the secret and product, by the prover and verifier from the trusted source;

decrypting the secret, by the prover and verifier;

decrypting the product, by the prover and verifier;

performing a plurality of verification dialog between the prover and verifier over the network, wherein the prover demonstrates knowledge of the secret and product without exposing the values of the secret and product, and wherein the client is denied access to a secure area of the host when the prover fails to demonstrate knowledge of the secret and product and granted access to the secure area when the client succeeds in demonstrating knowledge of the secret and product;

installing a first agent to be authenticated on a third computer on the network, the first agent having values for s, n and t, s being the secret, n being the product, and t being a size of an answer set;

installing a second agent on a fourth computer on the network, to authenticate the first agent, the second agent having values for s, n, and t;

generating r as a random number generated by the first agent;

calculating x by the first agent, r being raised to power of t modulus n;

sending x from the first agent to the second agent, over the network;

calculating b by the second agent, b being further defined as a member of set of integers from zero through t−1;

sending b from the second agent to the first agent, over the network;

calculating y by the first agent, y being a product of r*s raised to power of b;

sending y from the first agent to the second agent, over the network; and determining authentication of the first agent, by determining equivalence of a first equation to a second equation, if y is not equal to zero, first equation is y^t mod n and second equation is (xv^b) mod n.

11. The system of claim 10, the client computer comprising a cell phone.

12. The system of claim 10, the computer network comprising one or more of the Internet, a local area network, a communications link, and a wireless network.

13. The system of claim 10, the prover agent, verifier agent, first agent and second agent being respectively installed on the client computer, the host computer, the third computer and the fourth computer through common software.

* * * * *